(12) United States Patent
Yang

(10) Patent No.: US 8,297,181 B2
(45) Date of Patent: Oct. 30, 2012

(54) DEEP FRYER FOR COOKING FOODSTUFF

(75) Inventor: Weiqun Yang, Shenzhen (CN)

(73) Assignee: Hamilton Beach Brands, Inc., Glen Allen, VA (US)

( * ) Notice: Subject to any disclaimer, the term of this patent is extended or adjusted under 35 U.S.C. 154(b) by 623 days.

(21) Appl. No.: 12/251,194

(22) Filed: Oct. 14, 2008

(65) Prior Publication Data

US 2010/0089246 A1  Apr. 15, 2010

(51) Int. Cl.
*A47J 37/12* (2006.01)
(52) U.S. Cl. ............ 99/403; 99/407; 219/438; 219/442
(58) Field of Classification Search .......... 99/403, 99/285, 336, 407, 410–415, 418; 215/10; 219/429, 441–442, 438–439; 220/23.89, 220/23.91, 23.87, 573.4; *A47J 37/12; F27D 11/00*
See application file for complete search history.

(56) References Cited

U.S. PATENT DOCUMENTS

| | | | |
|---|---|---|---|
| 1,241,448 A | 9/1917 | Sherman | |
| 1,681,099 A * | 8/1928 | Clark | 219/441 |
| 2,033,011 A | 10/1935 | Schilling | |
| D174,721 S | 5/1955 | Steinbook | |
| 3,813,517 A * | 5/1974 | McGruder | 219/438 |
| D246,686 S | 12/1977 | Boldt | |
| D313,531 S | 1/1991 | Barrault | |
| 4,995,312 A * | 2/1991 | Leiros | 99/411 |
| D321,455 S | 11/1991 | Duquaine, Jr. et al. | |
| D338,133 S | 8/1993 | Mano et al. | |
| D345,281 S | 3/1994 | Mauffrey | |
| D368,620 S | 4/1996 | Piret | |
| D368,621 S | 4/1996 | Mano | |
| D368,623 S | 4/1996 | Hacker | |
| D369,505 S | 5/1996 | Philippe | |
| 5,570,623 A * | 11/1996 | Lin | 99/285 |
| D376,724 S | 12/1996 | Mendelson et al. | |
| D378,647 S | 4/1997 | Piret | |
| D381,242 S | 7/1997 | Rossiaud | |
| 5,678,721 A | 10/1997 | Cartigny et al. | |
| 5,730,045 A | 3/1998 | Delaquis et al. | |
| 5,794,522 A * | 8/1998 | Bois et al. | 99/330 |
| 5,911,346 A | 6/1999 | Onken | |
| D416,166 S | 11/1999 | Hirose et al. | |
| 5,996,477 A * | 12/1999 | Bois et al. | 99/403 |
| 6,257,124 B1 | 7/2001 | Chen | |
| 6,262,398 B1 * | 7/2001 | Busquets et al. | 219/429 |
| D452,412 S | 12/2001 | Jeong | |

(Continued)

FOREIGN PATENT DOCUMENTS

EP  1504706 A1 *  2/2005

(Continued)

*Primary Examiner* — Gene Kim
*Assistant Examiner* — Matthew B Stanczak
(74) *Attorney, Agent, or Firm* — Alexander D. Raring

(57) ABSTRACT

A kitchen appliance for cooking foodstuff in a liquid includes an outer shell having an upper surface and a lower surface, and a base enclosing the lower surface of the outer shell. A cooking pot is positioned within the outer shell for receiving the foodstuff and the liquid. The cooking pot has an upper rim and an air gap is defined by the outer shell, the base and the cooking pot. A heating element is positioned within the air gap. A rib is mounted between the upper surface of the outer shell and the upper rim of the cooking pot for preventing the flow of liquid into the air gap.

11 Claims, 9 Drawing Sheets

U.S. PATENT DOCUMENTS

| | | | |
|---|---|---|---|
| 6,478,614 B1 | 11/2002 | De'Longhi | |
| 6,499,390 B1 * | 12/2002 | Huang | 99/331 |
| 6,513,420 B1 | 2/2003 | Park | |
| D486,351 S | 2/2004 | Lu et al. | |
| 6,807,899 B2 * | 10/2004 | Dirand | 99/403 |
| D516,374 S | 3/2006 | McLemore | |
| 7,015,429 B2 | 3/2006 | Lau et al. | |
| D525,478 S | 7/2006 | Averty | |
| 7,075,038 B2 * | 7/2006 | McDuffie | 219/430 |
| D530,564 S | 10/2006 | Chiba | |
| D533,014 S | 12/2006 | Choi | |
| D552,922 S | 10/2007 | Dallaire | |
| 7,322,279 B2 | 1/2008 | Cartigny et al. | |
| D560,964 S | 2/2008 | Hoff | |
| 7,373,874 B2 | 5/2008 | Seurat Guiochet et al. | |
| 2002/0185012 A1 * | 12/2002 | Yokoyama | 99/413 |
| 2004/0112227 A1 * | 6/2004 | Dirand | 99/403 |
| 2004/0250690 A1 | 12/2004 | Restis et al. | |
| 2005/0269309 A1 | 12/2005 | Chung Lau et al. | |
| 2006/0272633 A1 | 12/2006 | Osias, Jr. | |
| 2008/0169281 A1 * | 7/2008 | Borovicka et al. | 219/441 |

FOREIGN PATENT DOCUMENTS

| | | | |
|---|---|---|---|
| ES | EP783861 | * | 7/1997 |
| ES | EP1504706 | * | 2/2005 |

* cited by examiner

DEEP FRYER FOR COOKING FOODSTUFF

BACKGROUND OF THE INVENTION

The present invention is directed to kitchen appliances for cooking foodstuff in a liquid and, more particularly, to a deep fryer or other similar cooking apparatus that enables a user to quickly and conveniently drain and/or pour cooking oil from within the interior of a container of the deep fryer once cooking of the foodstuff is complete.

Deep fryers are a relatively common household or restaurant appliance that are used to cook or fry foodstuff, typically chicken breasts, turkey breasts, French fries or other foodstuff that is desired to be fried. A typical deep fryer includes a housing which holds the cooking oil or other liquid to be heated and a basket which is placed inside the housing and which holds the foodstuff to be cooked. A heating coil, located inside the deep fryer, heats the liquid to a desired temperature to cook the foodstuff within the basket.

Once cooking is complete, disposal of the liquid used to cook the foodstuff is often an inconvenience for the user. Therefore, it is desirable that the liquid or cooking oil inside the deep fryer can be quickly and conveniently poured or dispensed into another container or a drain to assure that the liquid is not inadvertently spilled outside the deep fryer or that the liquid does not accidentally reach sensitive electrical components of the deep fryer. In the same sense, it would be desirable to provide structure within the deep fryer that permits a user to conveniently drain the liquid or cooking oil once cooking is complete.

When removing or pouring the liquid or oil from a deep fryer, a user prefers to have full control over the deep fryer to assure that the liquid is not spilled outside of the deep fryer. Further, it is important that the various components of the deep fryer are securely held in place such that the structure of the deep fryer maintains its proper position as the cooking oil is removed or drained from the deep fryer. It is also desirable that the deep fryer is constructed in a relatively tight and/or compact manner to assure that inadvertent or errant drips or cooking stuff do not enter relatively sensitive or purposefully confined areas of the deep fryer.

Further, conventional deep fryers often come with several components or pieces that fit together, such as the housing and basket. Typically, it is the user's responsibility to properly position the components together before cooking the foodstuff. However, this can create an inconvenience for the user if the assembly is not straightforward or simple. Therefore, it would be desirable to provide a deep fryer with a structure that allows for quick and convenient assembly.

BRIEF SUMMARY OF THE INVENTION

Briefly stated, the present invention is directed to a kitchen appliance for cooking foodstuff in a liquid. The kitchen appliance includes an outer shell having an upper surface and a lower surface, and a base enclosing the lower surface of the outer shell. A cooking pot is positioned within the outer shell for receiving the foodstuff and the liquid. The cooking pot has an upper rim and an air gap is defined by the outer shell, the base and the cooking pot. A heating element is positioned within the air gap. A rib is mounted between the upper surface of the outer shell and the upper rim of the cooking pot for preventing the flow of liquid into the air gap.

BRIEF DESCRIPTION OF THE SEVERAL VIEWS OF THE DRAWINGS

The foregoing summary, as well as the following detailed description of a preferred embodiment of the present invention, will be better understood when read in conjunction with the appended drawings. For the purpose of illustrating the invention described in the present application, there is shown in the drawings, an embodiment which is presently preferred. It should be understood, however, that the invention is not limited to the precise arrangements and instrumentalities shown. In the drawings.

DETAILED DESCRIPTION OF THE INVENTION

Figure 1:
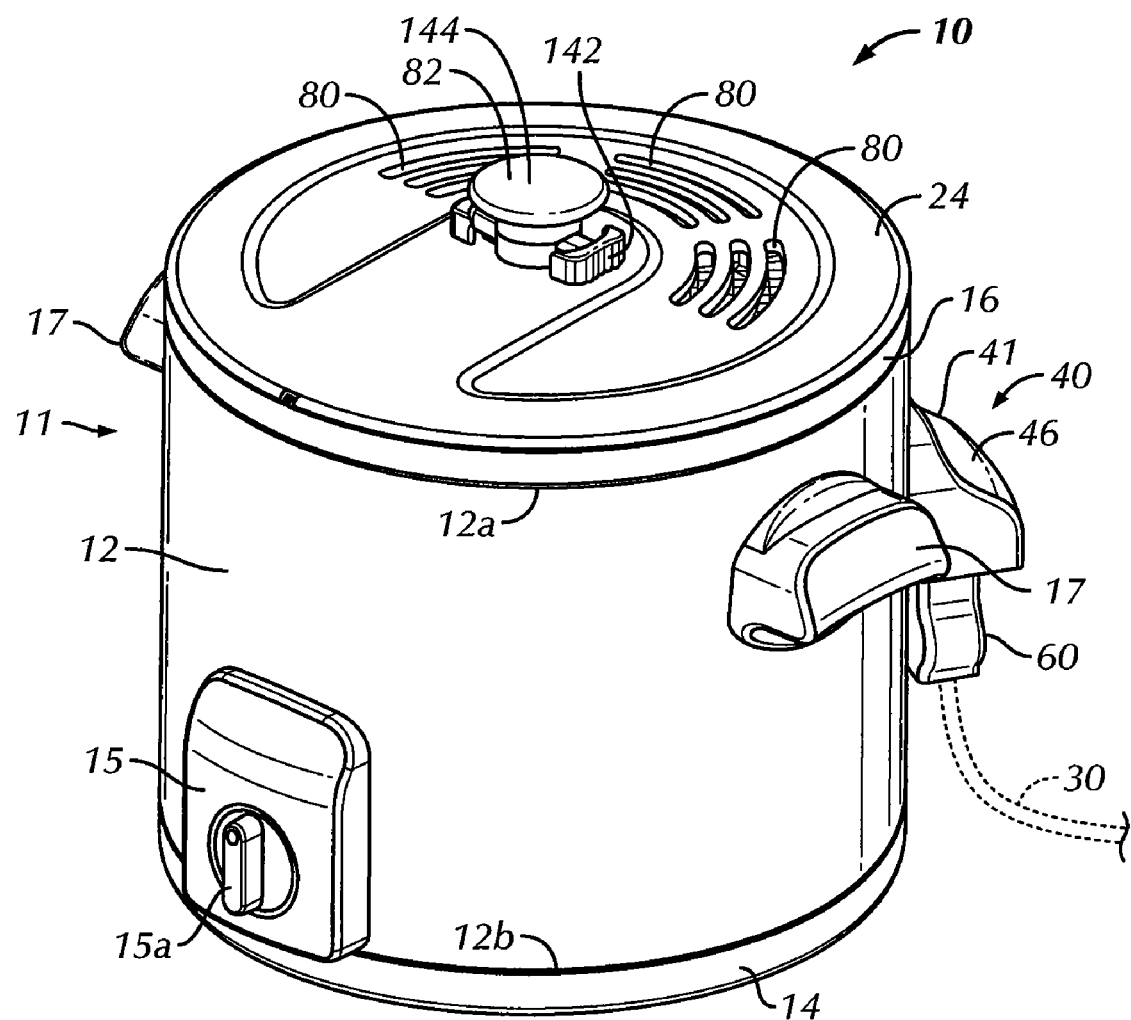
FIG. 1 is a front right side perspective view of a preferred embodiment of a deep fryer in accordance with the present invention.

Certain terminology is used in the following description for convenience only and is not limiting. The words "right", "left", "lower" and "upper" designate directions in the drawings to which reference is made. The words "inwardly" and "outwardly" refer to directions toward and away from, respectively, the geometric center of the kitchen appliance and designated parts thereof. The terminology includes the above-listed words, derivatives thereof and words of similar import.

Referring now to the drawings in detail, wherein like numerals are used to indicate like elements throughout, there is shown in FIGS. 1-10 a presently preferred embodiment of a kitchen appliance, generally designated 10, for cooking foodstuff (not shown) in a liquid, such as cooking oil or the like (not shown). Preferably, the kitchen appliance 10 is a deep fryer, but the kitchen appliance 10 could be other product such as a crock pot or steamer machine, for example. The deep fryer 10 is a relatively small, light-weight and portable device, as compared to conventional deep fryers. The deep fryer 10 preferably includes a container 11 for receiving the foodstuff and the liquid and a lid 24 removably mountable to the container 11. The container 11 is preferably circular or cylindrical in shape and includes an upper, open end and a lower, closed end. A sidewall generally orthogonally extends from the lower, closed end and has an interior surface and an exterior surface. The lid 24 is removably mountable to the upper, open end of the container 11 to enclose the foodstuff and the liquid therein.

Figure 2:
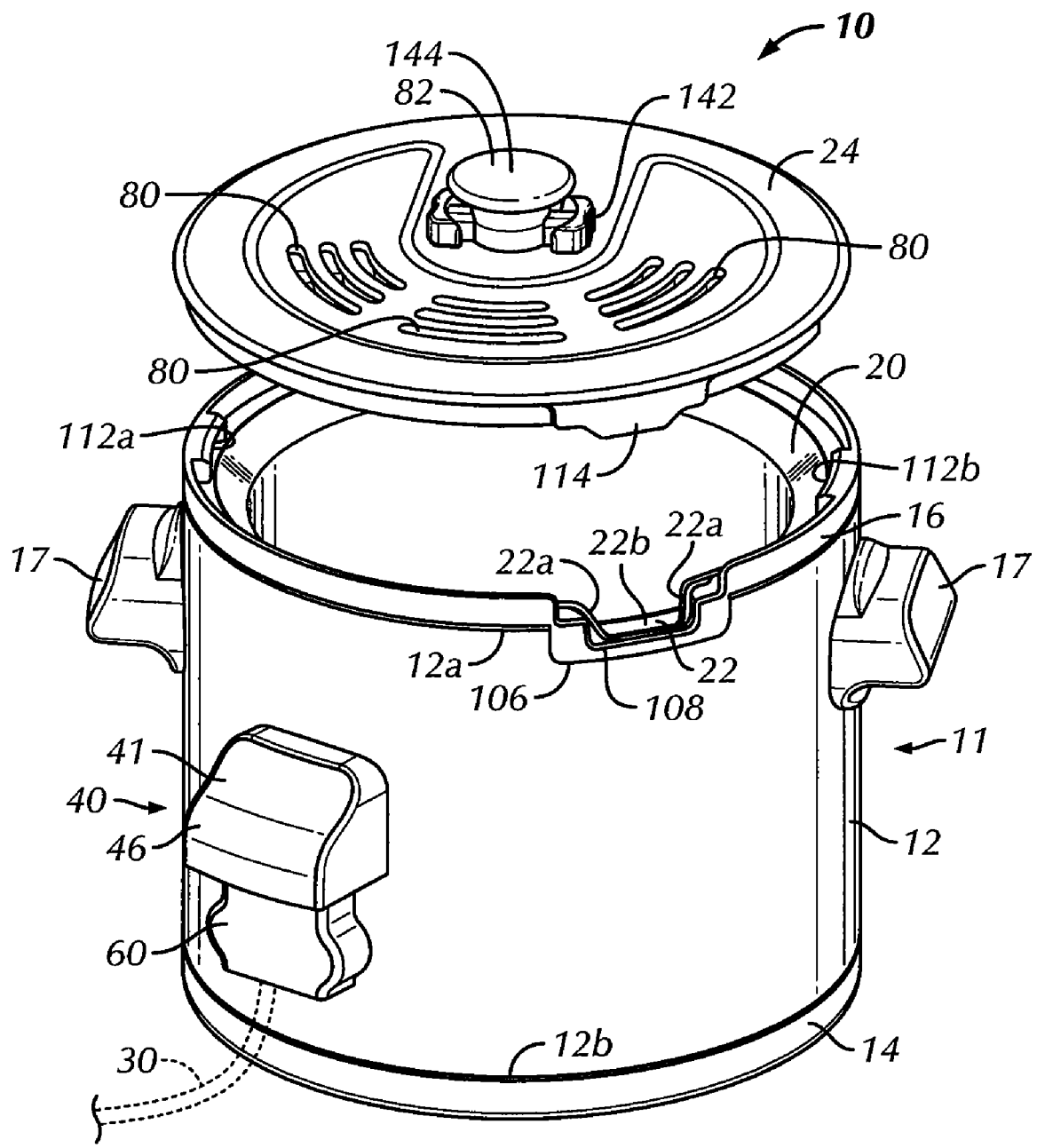
FIG. 2 is a rear left side perspective view of the deep fryer shown in FIG. 1, with a lid shown in a spaced-apart relationship from a container of the deep fryer.
Figure 3:
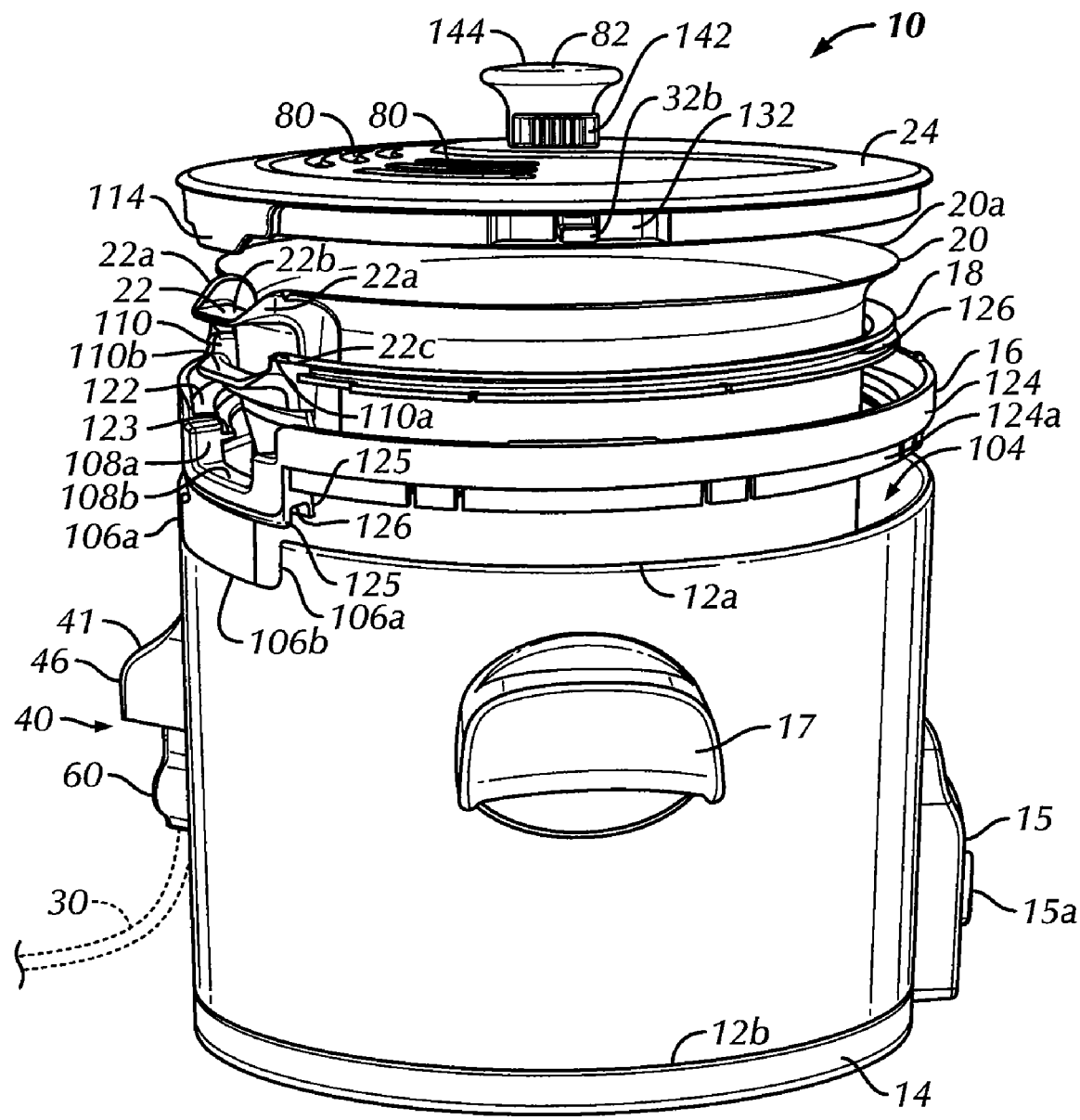
FIG. 3 is a left side perspective view of the deep fryer shown in FIG. 1 in a partially exploded position.

As seen in FIGS. 1-5, the container 11 includes an outer shell or wrap 12 having an upper surface or rim 12a and a lower surface or rim 12b. The outer shell 12 has an exterior surface exposed to the external environment and an internal surface that is exposed to the interior of the deep fryer 10. The outer shell 12 is generally circular or cylindrical in shape and is preferably formed of a high strength, light weight material, such as a metallic material. As seen in FIG. 3, the outer shell 12 is a relatively thin layer or structure that encloses and protects the interior structure of the deep fryer 10. The outer shell 12 preferably includes a cut-out 106 adjacent to the upper surface 12a thereof. Specifically, the cut-out 106 is generally rectangular in shape when viewed from the side and has two spaced-apart, vertically extending, edge portions 106a that intersect an elongated, horizontally-extending, edge portion 106b that is spaced a predetermined distance below the upper rim 12a of the outer shell 12.

Figure 6:
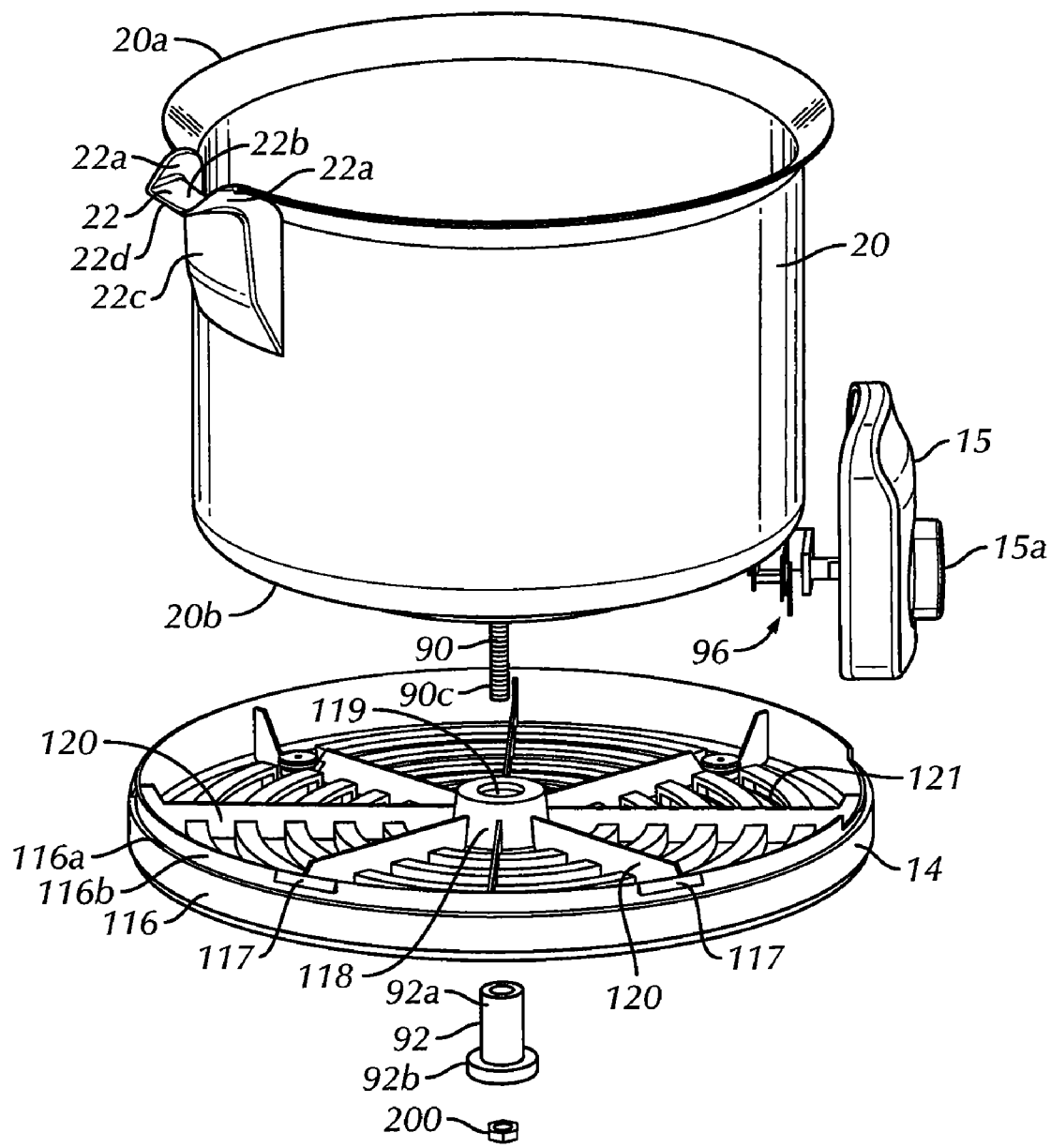
FIG. 6 is an exploded top perspective view of portions of the deep fryer shown in FIG. 1, with certain structure removed for clarity.
Figure 7:
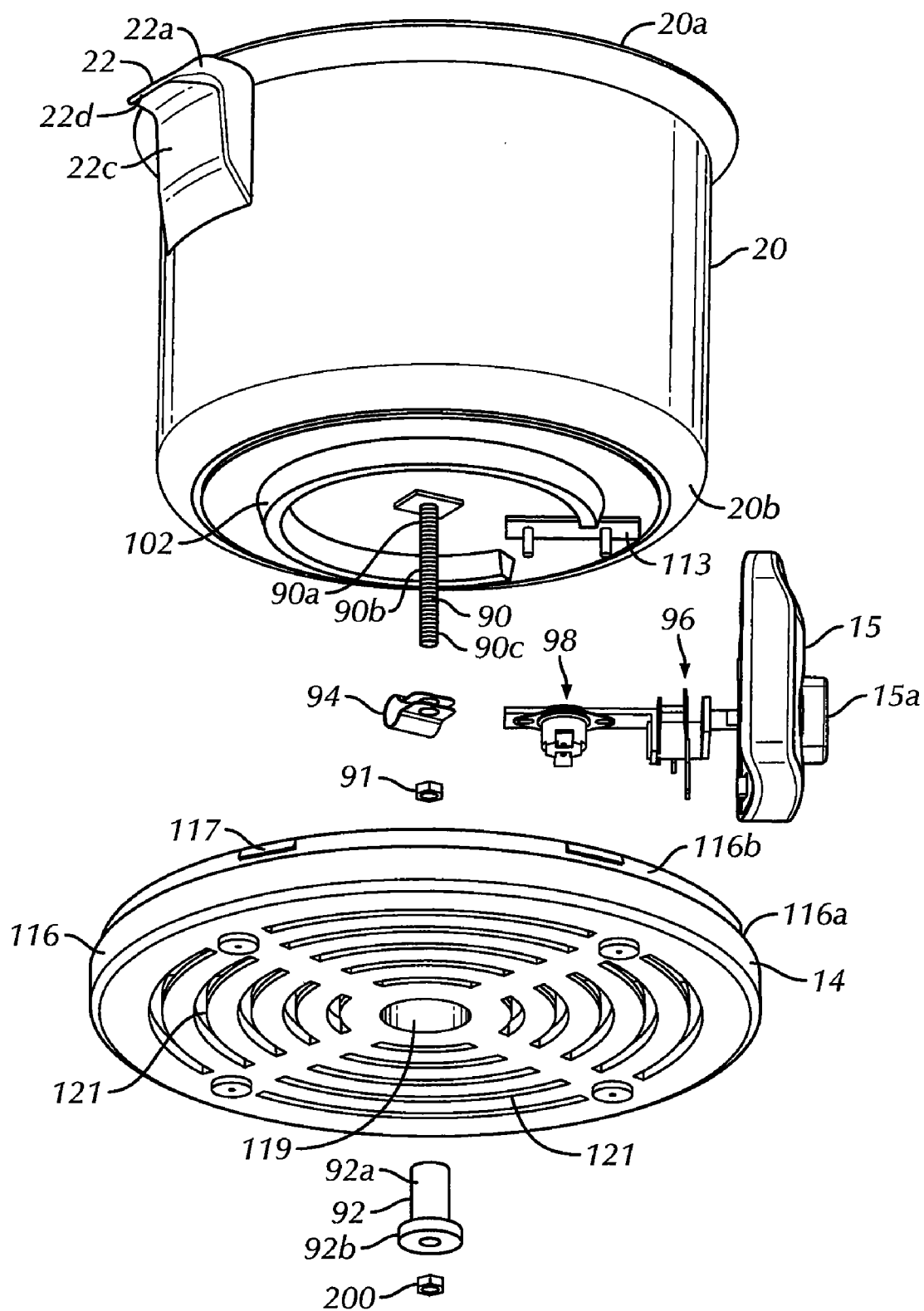
FIG. 7 is an exploded bottom perspective view of portions of the deep fryer shown in FIG. 1, with certain structure removed for clarity.

As seen in FIGS. 1, 6 and 7, a control housing 15 is preferably permanently mounted to the exterior surface of the outer shell 12. In the preferred embodiment, the control housing 15 includes a rotatable dial 15a that allows the user to selectively control and/or adjust an adjustable thermostat 96 (FIGS. 6 and 7) enclosed within the deep fryer 10. As seen in FIG. 7, the deep fryer 10 may include a fixed temperature thermostat 98 in series with the adjustable thermostat 96 to regulate the temperature in an alternative manner. It is understood by those skilled in the art that the deep fryer 10 may include both or only one of the thermostats 96, 98. The control housing 15 may include a timer knob (not shown) and/or a power switch (not shown). A consumer or user can selectively control a heating element 102, such as a CalRod, by adjustment of the thermostat 96 through manipulation of the dial 15a. Alternatively, the control housing 15 may include one or more buttons, levers or knobs (not shown) that allow the user to control operation of the heating element 102. Furthermore, the deep fryer 10 is not limited to the inclusion of a control housing 15, or the control housing 15 may be positioned inside the deep fryer 10.

As seen in FIGS. 1-3 and 5, the deep fryer includes at least one, but preferably two spaced-apart handles 17 permanently attached to opposing sides of the exterior surface of the outer shell 12. The handles 17 allow the user to control movement and placement of the deep fryer 10. Further, an electrical connector 40 is mounted to the exterior surface of the outer wrap 12 and operatively connects the thermostat 96 and heating element 102 to an electrical power source, such as an electrical outlet mounted on a wall. The electrical connector 40 includes a socket 41, having an outer housing 46 to at least partially enclose at least one but preferably two spaced-apart electrical contacts (not shown) located therein, and a plug 60 removably mountable to the socket 41. A power cord 30 (shown in phantom in FIGS. 1-3) extends from the plug 60 and operatively engages with an electrical outlet (not shown) or other power source. Portions of a plug 60 engage the electrical contacts of the socket 41, which allows the user to selectively provide and cut power to the deep fryer 10. The socket 41 is preferably oriented such that the plug 60 must be substantially vertically oriented to operatively connect to the deep fryer 10 to the power source. Further, the socket 41 and plug 60 are preferably magnetically connected, thus reducing the force required to separate the plug 60 from the socket 40. The vertical orientation of the socket 41 and plug 60 and the magnetic connection between the socket 41 and plug 60 create a break-away electrical connection that can be relatively easily disengaged to prevent the deep fryer 10 from inadvertently tipping when the plug 60 is removed from the socket 41.

Referring to FIGS. 1-3 and 5-7, the container 11 includes a base 14 at the lower or bottom end thereof. Specifically, the base 14 engages and/or encloses the lower rim 12b of the outer shell 12. The base 14 is generally circular or cylindrical in shape and is sized and shaped to conform to and/or generally tightly fit within or around the lower surface 12b of the outer shell 12. Specifically, as seen in FIGS. 6 and 7, the base 14 includes a vertically-extending sidewall 116 having a lip or horizontally-extending edge portion 116a that extends around the outer circumference of the base 14 proximate a vertical midsection thereof. An upper, free end 116b of the sidewall 116 is slightly recessed with respect to the portion of the sidewall 116 that is beneath the lip 116a, such that the lower rim 12b engages and/or sits on the lip 116a. A plurality of spaced-apart protrusions 117 may extend from an exterior surface of the upper, free end 116b to engage the interior surface of the outer shell 12. The projections 117 ensure that the base 14 properly engages the outer shell 12. Preferably, the base 14 further includes a central hub 118 having a passageway 119 therethrough. A plurality of slats 120 tangentially extend from an exterior surface of the central hub 118 toward and/or to an interior surface of the sidewall 116 of the base 14. Further, a plurality of generally arcuate openings 121 are located between and generally orthogonal to the slats 120 and provide a passage way to promote the flow of air into and out of the deep fryer 10 to help cool the outer shell 12 of the deep fryer 10 when the heating element 102 is operating.

Figure 4:
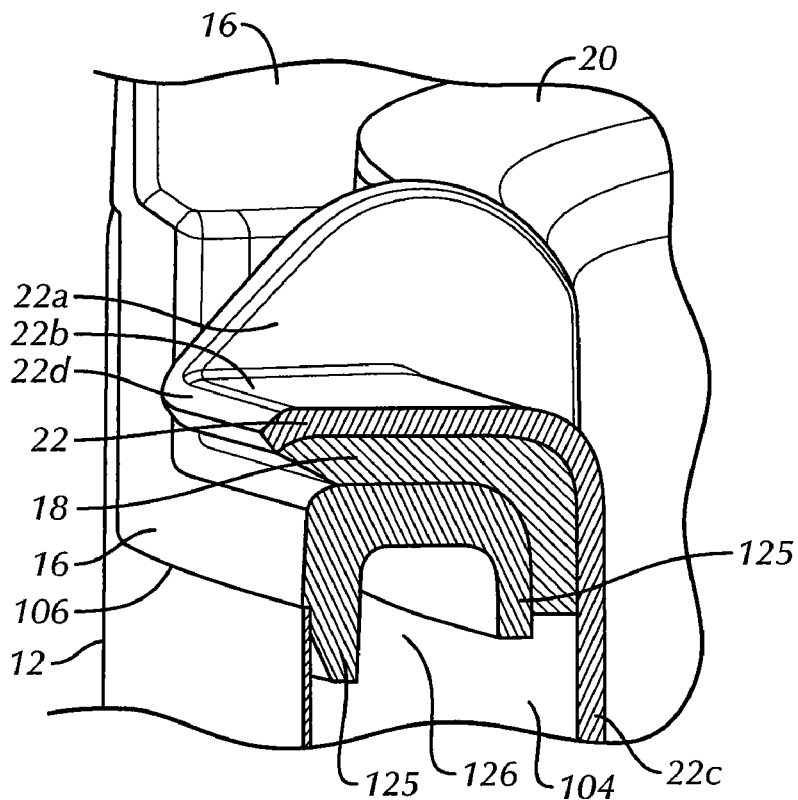
FIG. 4 is a magnified cross-sectional view of a portion of the assembled container of the deep fryer shown in FIG. 1.
Figure 5:
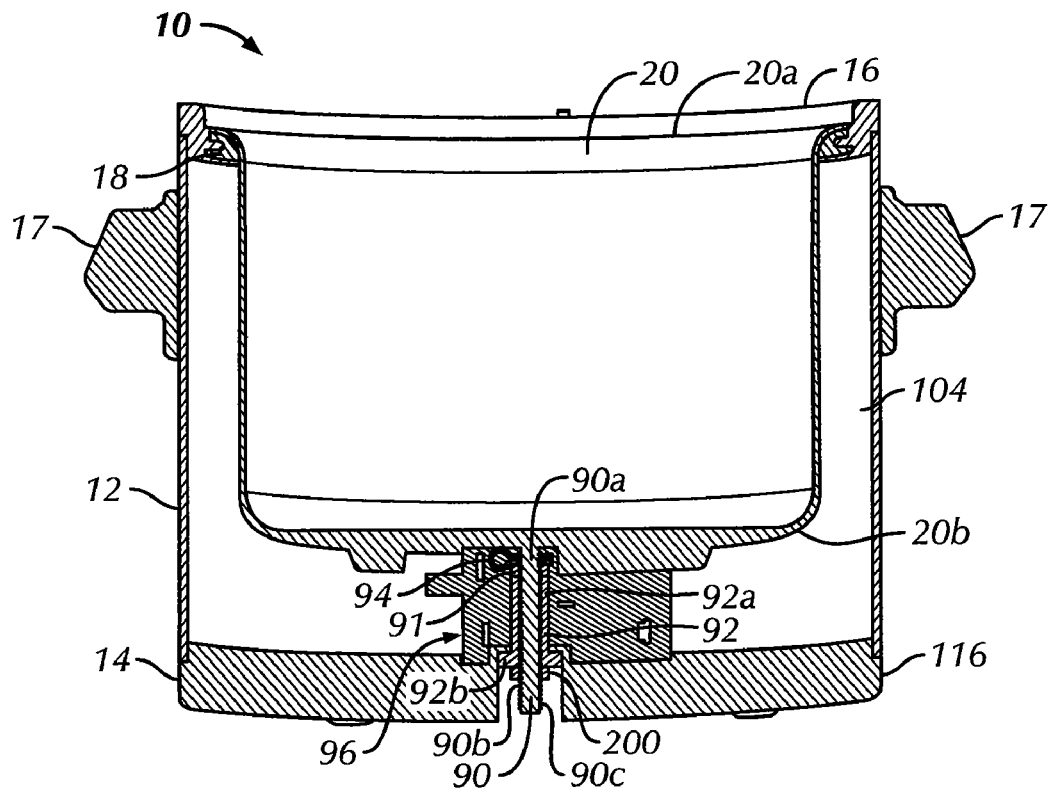
FIG. 5 is a rear cross-sectional elevation view of portions of the deep fryer shown in FIG. 1, with certain structure removed for clarity.

Referring to FIGS. 2-7, the container 11 further includes a cooking pot 20 positioned within and/or fixedly mounted inside the outer shell 12. The cooking pot 20 directly receives the foodstuff and the liquid to be cooked and/or heated. The cooking pot 20 has a radially outwardly extending upper open rim 20a and a lower closed end 20b. The cooking pot 20 is preferably circular or cylindrical in shape to conform to the shape of the outer shell 12 and base 14. However, the diameter of the cooking pot 20 is preferably less than that of the outer shell 12 and/or base 14. As seen in FIGS. 3-5, an air gap 104 is defined by and/or between the outer shell 12, the base 14 and the cooking pot 20. The heating element 102 is preferably permanently affixed, or brazed, to an exterior surface of the lower end 20b. Thus, the heating element 102 is positioned within the air gap 104 and is positioned between the outer shell 12, the base 14 and the cooking pot 20.

Referring to FIGS. 5-7, the thermostat 96 allows the user to control the temperature of the heating element 102 through manipulation of the control dial 15a. In operation, the thermostat 96 senses the temperature transferred from an aluminum bracket 113 attached to the bottom closed end 20b of the cooking pot 20. In operation, once the temperature of the cooking pot 20 reaches a selected high set point, the thermostat 96 cuts off power to the heating element 102 and the cooking pot 20 begins to cool down to a predetermined low set point temperature below the high set point. Once the temperature of the cooking pot 20 drops or reaches the predetermined lower set point, the thermostat 96 reconnects the heating element 102 to the electrical power supply and the heating element 102 begins to heat up again. During the cooking cycle, the thermostat 96 can maintain the temperature of the cooking pot 20 at a desired level by cutting off power to the heating element 102 when the temperature reaches the high set point and providing power to the heating element 102 when the cooking pot 20 reaches the lower set point.

The cooking pot 20 preferably includes a pour spout 22 located at and preferably extending from the upper rim 20a. The pour spout 22 allows the user to dispense and/or pour the liquid or cooking oil from the cooking pot 20 in a quick and convenient manner. Specifically, the pour spout 22 includes two spaced-apart, vertically-extending, sidewalls 22a that extend to opposite ends of a horizontally-extending base wall 22b that is spaced a predetermined distance from the upper rim 20a of the cooking pot 20. A lower portion 22c of the pour spout 22 forms an extension of the cooking pot 20 such that the liquid or cooking oil is guided toward an outer/upper lip 22d of the pour spout 22 for clean and easy pouring of the liquid. In operation, once the cooked foodstuff has been removed from the cooking pot 20, the temperature of the deep fryer 10 and liquid has cooled, and the lid 24 has been removed from the container 11, a user can manipulate and/or tilt the container 11 such that the liquid within the cooking pot 20 is poured and/or drained through the pour spout 22 to a drain or another container.

Figure 9:
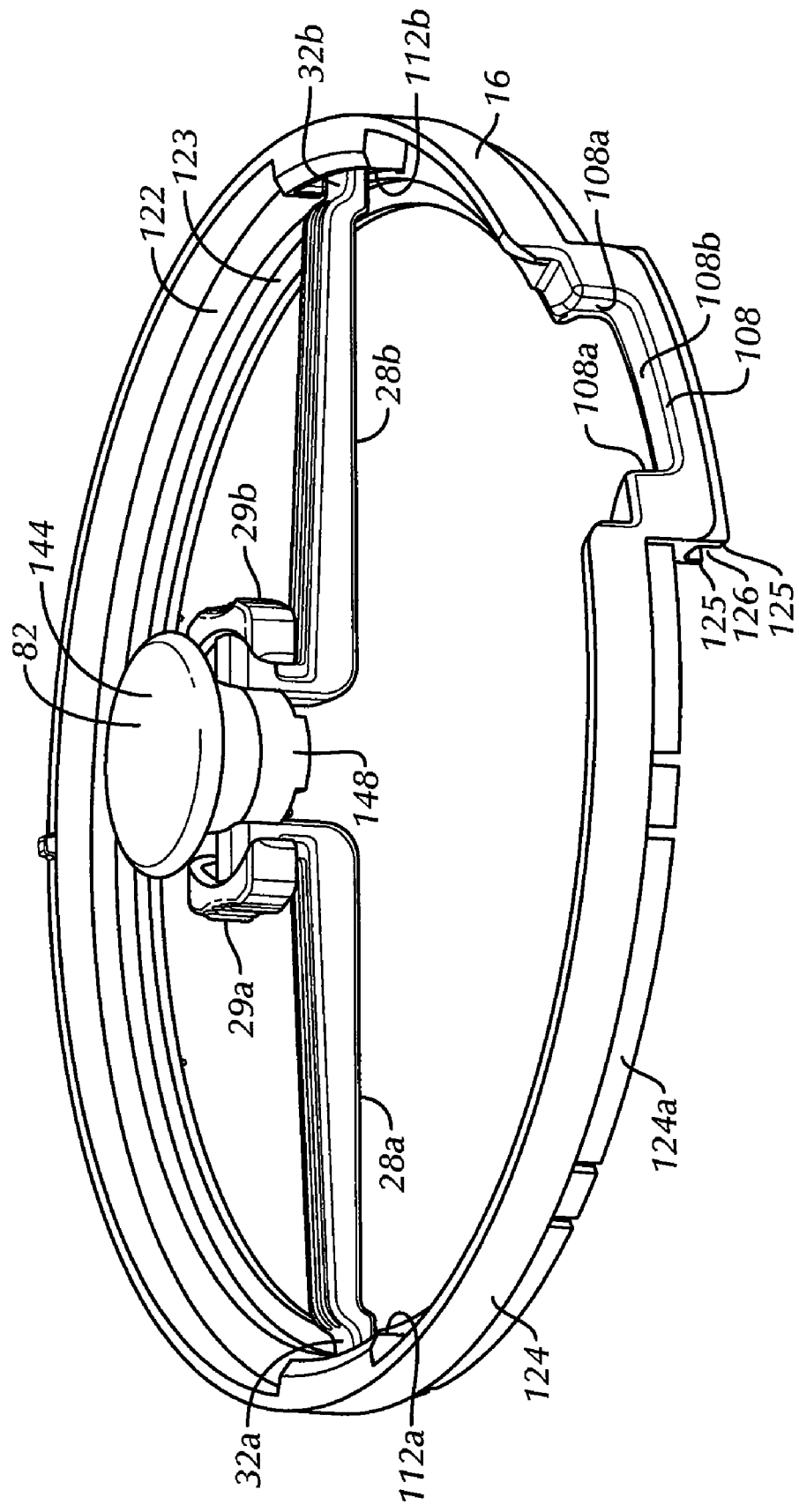
FIG. 9 is a top perspective view of a portion of the lid and a ring of the container of the deep fryer shown in FIG. 1, with certain structure removed for clarity.

Referring to FIGS. 1-5 and 9, the container 11 further includes a ring 16 securely attached to the upper rim 12a of the outer shell 12. The ring 16 is generally circular or cylindrical in shape to conform to the generally circular or cylindrical shape of the upper surface 12a of the outer shell 12. As seen in FIGS. 3 and 9, an interior sidewall of the ring 16 preferably includes two vertically spaced-apart ledges 122, 123 that extend radially inwardly towards a geometric center of the deep fryer 10. The lower ledge 123, which preferably extends further radially inwardly towards the geometric center of the deep fryer 10 than the upper ledge 122, is positioned below the upper ledge 122. The ring 16 further includes a vertically-extending sidewall 124 on an exterior surface thereof. A lower portion 124a is preferably recessed or has a smaller diameter than sidewall 124 such that the outer shell 12 generally forms a smooth transition with the sidewall 124 of the ring 16 when the ring 16 is properly mounted to the outer shell 12 as shown.

As seen in FIGS. 2 and 9, the interior surface of the ring 16 preferably includes at least one, but preferably two spaced-apart lips 112a, 112b. Specifically, the lips 112a, 112b are formed on opposite sides of the interior surface of the ring 16 and formed on or above the upper ledge 122. The lips 112a, 112b, which are preferably in the form of recesses, are generally rectangular in shape and extend from the interior surface of the ring 16 towards the exterior surface of the ring 16. The ring 16 is not limited to the inclusion of the recesses 112a, 112b or the shape, size or location shown and described herein.

Referring to FIGS. 3 and 9, the ring 16 further includes a conduit 108 have two spaced-apart edge portions 108a that vertically extend to opposite ends of a horizontally-extending base portion 108b that is spaced a predetermined distance from a top edge of the ring 16. As seen in FIGS. 3, 4 and 9, two spaced-apart elongated walls 125 orthogonally extend from the base portion 108b and form an archway 126 therebetween. The walls 125 and archway 126 improve the rigidity of the conduit 108 using minimal material. When the container 11 is in the properly assembled position, the ring 16 is placed onto the outer shell 12 such that at least a portion of the conduit 18 fits within the cut-out 106 of the outer shell 12. Thus, the cut-out 106 of the outer shell 11 is sized and shaped to receive the conduit 108 of the ring 16 therein.

Referring to FIGS. 3-5, the container 11 also includes a rib 18 mounted between the upper rim 12a of the outer shell 12 and the upper rim 20a of the cooking pot 20. Specifically, the rib 18 is secured between a top surface of the ring 16 and beneath the upper rim 20a of the cooking pot 20. The structure, shape and positioning of the rib 18 prevents the flow of inadvertent or errant drips of liquid or cooking oil from entering the air gap 104, where relatively sensitive electrical components are located. The rib 18 is generally circular or cylindrical in shape to conform to the shape of the cooking pot 20, the ring 16 and the outer shell 12. Preferably, the rib 18 has a larger diameter than a diameter of a sidewall of the cooking pot 20. However, the diameter of the rib 18 is preferably less than a diameter of the ring 16. The rib 18 is preferably formed of silicon, but may be formed of virtually any type of high strength, light weight material.

As seen in FIG. 3, a groove or channel 126 preferably extends virtually the entire circumference of the rib 18 at generally a vertical midsection of the exterior surface thereof. The groove 126 is sized and shaped to receive the lower ledge 123 of the ring 16, which helps to properly position the rib 18. However, the groove 126 may be sized and shaped to receive or conform to a different portion of the deep fryer 10. The rib 18 further includes a channel 110 having two spaced-apart, vertically extending, sidewalls 110a that extend downwardly from a top surface of the ring 18 to opposite ends of a horizontally-extending ledge 110b that is spaced a predetermined distance from a top surface of the ring 16. The overall size and shape of the channel 110 is preferably smaller than that of the conduit 108 of the ring 16, such that the conduit 108 is sized and shaped to receive the channel 110 of the rib 18 when the container 11 is properly assembled (FIGS. 1, 2 and 4). Likewise, the general size and shape of the channel 110 of the rib 18 is larger than the general size and shape of the pour spout 22 of the cooking pot 20, such that the channel 110 is sized and shaped to receive the pour spout 22 of the cooking pot 20 when the container 11 is properly assembled (FIGS. 1, 2 and 4). It is understood by those skilled in the art that the specific size, shape and structure of the outer shell 11, ring 16, rib 18 and cooking pot 20 assist the user in determining whether or not the various components of the deep fryer 10 are properly positioned.

Referring to FIGS. 5-7, an elongated rod 90 orthogonally extends from the lower surface 20b of the cooking pot 20. The rod 90 is generally circular in shape when viewed from below and is preferably welded to the pot 20 at a first end 90a of the rod 90. A hex nut 91 may surround a portion of the rod 90 proximate to the first end 90a A second end 90b of the rod 90 preferably includes a series of threads 90c. However, the entire rod 90 may include threads. When the deep fryer 10 is in the assembled configuration (FIGS. 1 and 5), the threads 90c on the second end 90b of the rod 90 extend through the passageway 119 of the central hub 118 of the base 14 such that the cooking pot 20 may be fixedly mounted to the base 14.

Specifically, a spacer 92 and a hex nut 200 surround at least a portion of the rod 90 and properly secure the rod 90 to the base 14. The spacer 92 has an elongated body 92a having a central passageway therethrough and a flattened or wider lower end 92b is retained in position by the hex net 200 having complimentary screw threads on an interior surface thereof. Specifically, the threads of the hex nut 200 engage the threads 90c of the rod 90 to fix the cooking pot 20 with respect to the base 14 and outer shell 12. In the assembled configuration (FIGS. 1 and 5), the elongated body 92a is positioned inside the base 14 and the lower end 92b is positioned outside the base 14, such as against a portion of the exterior bottom of the base 14. The spacer 92, which is preferably formed of polybutylene terephthalate (PBT) or other similar polymeric material, functions as an insulator and can withstand temperatures at least as high as 135° C. Thus, due to the spacer 92, the cooking pot 20 is securely mounted to the base 14 and heat transferred from the cooking pot 20 to the rod 90 is not transferred to the base 14.

Furthermore, a C-shaped bracket 94 is preferably positioned between a top surface of the hex nut 91 and the closed bottom surface 20b of the cooking pot 20. As understood by those skilled in the art, the structure of the rod 90, the spacer 92 and the bracket 94 provide a relatively simple structural connection between the base 14 and the cooking pot 20 to assure that the cooking pot 20 and the base 14 are permanently attached. Further, properly attaching the lower end 92b of the spacer 92 around the rod 90 on the exterior surface of the base 14, the cooking pot 20 securely tightens and/or sandwiches the ring 16 and rib 18 against the upper rim 12a of the outer shell 11, which prevents leaks of inadvertent liquid into the air gap 104.

Referring to FIGS. 1-3 and 8-10, the lid 24 includes a generally bulbous handle 82 that extends from a top surface thereof, two oppositely oriented elongated sliders 28a, 28b preferably positioned within the lid, at least one biasing member 84, a filter or sieve 27 and a liner 26 attached to a bottom surface thereof. The lid 24 is generally circular in shape when viewed from above or below to conform to the size and shape of the container 11 of the deep fryer 10. An arcuate flange or sidewall 130 orthogonally extends from the bottom surface of the lid 24 around the entire outer circumference of the lid 24. Further, the flange 130 of the lid 24 includes two oppositely spaced indentations 132 at generally the outer circumference of the lid 24. A catch or tongue 114 extends a predetermined distance beyond and/or below the flange 113. The tongue 114 is sized and shaped to at least partially enclose and/or cover the conduit 108 of the ring 16 when the lid 24 is placed on the container 11. Thus, when the lid 24 is properly positioned on the container 11, the tongue 114 aligns with the conduit 108 to help prevent hot liquid or cooking oil from inadvertently flowing out of the pour spout 22 of the cooking pot 20. The tongue 114 provides a visual indication to the user of the proper orientation of the lid 24 onto the container 11. Specifically, when the tongue 114 is properly fitted within the cut-out 106 of the outer shell 12, the user can be sure that the indentations 132 are properly aligned with the recesses 112a, 112b of the container 11, such that the sliders 28a, 28b can properly engage the recesses 112a, 112b.

Figure 8:
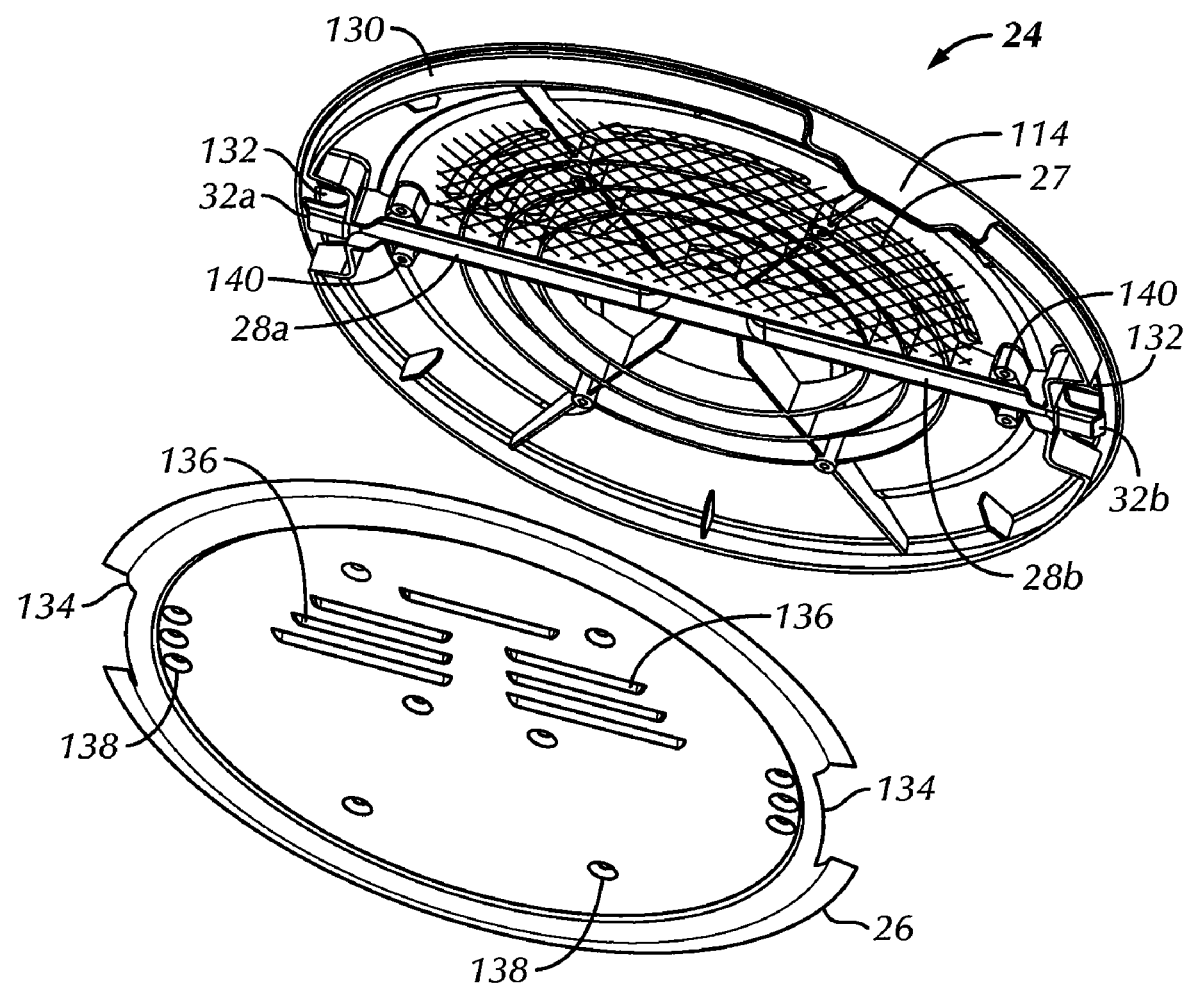
FIG. 8 is a is an exploded bottom perspective view of the lid of the deep fryer shown in FIG. 1.

As seen in FIG. 8, the liner 26 encloses the bottom surface of the lid 24. Preferably, the liner 26 is formed of a metallic material, but may be formed of virtually any high strength, light weight material. The liner 26 is generally circular in shape to conform to the shape of the lid 24. To match the shape of the lid 24, the liner 26 includes two oppositely spaced indentations 134 to match the oppositely spaced indentations 132 of the lid 24. The liner 26 preferably includes one or more louvered vents 136 that preferably align with one or more louvered vents 80 that extend through the lid 24. The vents 80, 136 allow a selective amount of hot gas and/or moisture to escape from the container 11 when the lid 24 is mounted thereto. Preferably, the liner 26 also includes one or more screw slots 138 that permit passage of a screw, bolt or other fastening means (not shown) to fixedly attach the liner 26 to screw sockets 140 spaced-apart on the bottom surface of the lid 24. The filter 27 is preferably positioned between the liner 26 and the bottom surface of the lid 24 at or near the vents 80, 136, to prevent relatively large particles and/or objects from passing therethrough.

Figure 10:
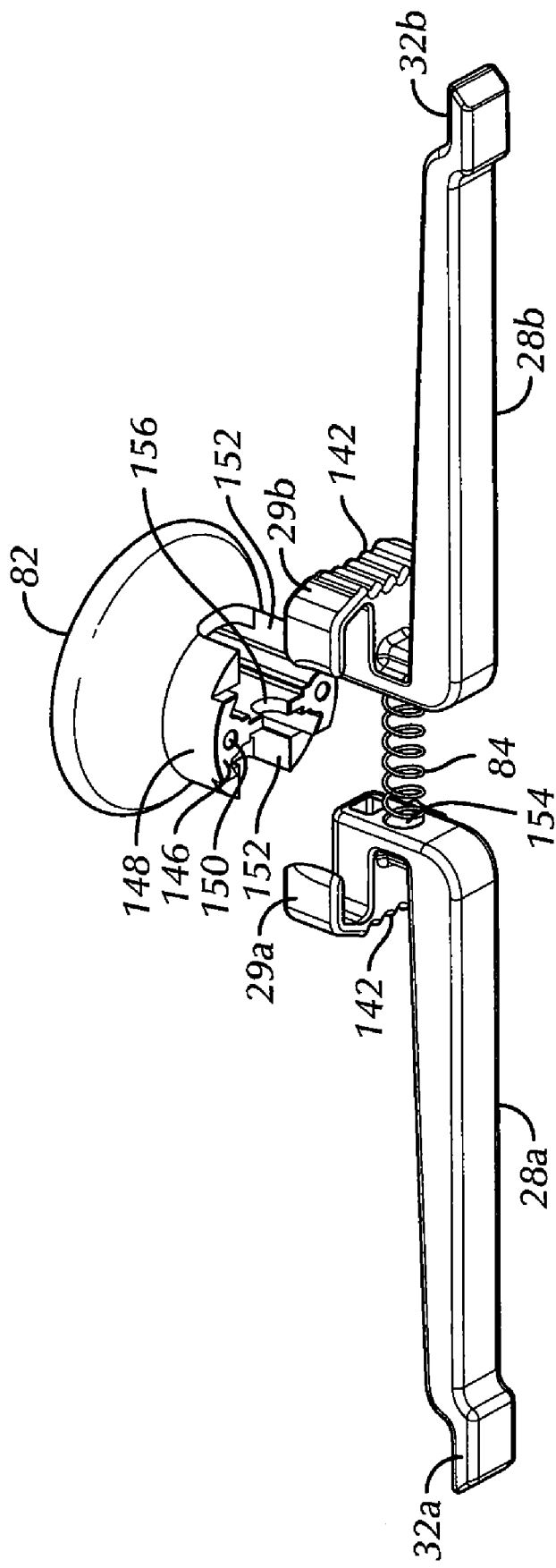
FIG. 10 is an exploded bottom perspective view of selected portions of the lid of the deep fryer shown in FIG. 1.

The sliders 28a, 28b are formed of a first elongated slider 28a and a second elongated slider 28b. The first elongated slider 28a has a proximal end 29a located at generally the geometric center of the lid 24. A second, distal end 32a of the first elongated slider 28a is spaced from the proximal end 29a at generally the outer circumferential point of the lid 24. Thus, the proximal end 29a of the first elongated slider 28a is positioned adjacent to a first side of the handle 82 and the distal end 32a of the first elongated slider 28a is positioned proximate to the outer circumferential edge of the lid 24. The second elongated slider 28b also includes a first, proximal end 29b located adjacent to a second, opposite side of the handle 82 and a second, distal end 32b adjacent to the outer circumferential edge of the lid 24. As seen in FIGS. 8-10, the sliders 28a, 28b are oppositely oriented within the lid 24 such that the sliders 28a, 28b are spaced from each other approximately a full 180 degrees. The proximal end 29a, 29b of each slider 28a, 28b is in the form of a gripping member. Each gripping member has a plurality of vertically oriented spaced-apart ribs 142 that provide an optimal surface to receive and/or engage a users fingers and/or thumb. The distal end 32a, 32b of each slider 28a, 28b is in the form of a generally streamlined projection that is sized and shaped to fit within one of the recesses 112a, 112b of the ring 16 when the lid 24 is placed on the container 11.

Referring to FIGS. 9 and 10, the handle 82 of the lid has a top planer surface 144, a bottom surface 146 and a generally arcuate midsection 148 therebetween. The bottom surface 146 of the handle 82 includes at least one, but preferably two spaced-apart screw holes 150 to receive a screw, bolt or other fastening means (not shown) to fixedly secure the handle 82 to the top surface of the lid 24. The midsection 148 of the handle 82 preferably includes two oppositely oriented recessed portions 152 that are sized and shaped to receive portions of each elongated slider 28a, 28b. Further, a passageway 154, preferably in the shape of an arch, connects each recessed portion 152 of the handle 82. The handle 82 is not limited to the exact size, shape and structure described above, but may be modified to conform to additional biasing members or differently shaped and/or sized sliders 28a, 28b.

In the preferred embodiment, the at least one biasing member 84 is positioned between the proximal ends 29a, 29b of the elongated sliders 28a, 28b. Preferably, the at least one biasing member 84 is in the form of a tension coil spring having a first end spaced from a second, opposite end. The first end of the spring 84 is preferably attached to the first elongated slider 28 and the second end of the spring 84 is preferably attached to the second elongated slider 28b. In the preferred embodiment, each slider 28a, 28b, includes a depression 154 sized and shaped to receive one of the ends of the spring 84 to properly hold the spring 84 in position. However, the depressions 154 may alternatively be in the form of one or more posts or projections that are sized and shaped to receive and/or engage portions of the spring 84. When the lid 24 is in the assembled configuration (FIGS. 1-3), the handle 82 at least partially engages and/or surrounds a portion of the biasing member 84 extending therethrough. Specifically, a portion of the biasing member 84 fits within the arch 156 of the handle 82. Those skilled in the art understand that the lid 24 may incorporate two or more biasing members 84 and/or three or more sliders 28a, 28b.

When the lid 24 is in the assembled configuration (FIGS. 1-3), the inherent force created by the at least one biasing member 84 directly urges the proximal end 29a of the first elongated member 28a away from the proximal end 29b of the second elongated member 28b. This force urges the distal ends 32a, 32b of each slider 28a, 28b through the indentations 132 in the sidewall 130 of the lid 24 and toward and/or into the recesses 112a, 112b of the ring 16. When the user desires to remove the lid 24 from the container 10, the user presses each gripping member of each proximal end 29a, 29b towards the geometric center of the handle 82. This force created by the user overcomes the inherent force in the biasing member 84 and the biasing member 84 becomes compressed. As the biasing member 84 gives way to the force of the user's fingers/hand, the distal ends 32a, 32b of each slider 28a, 28b are retracted from the recesses 112a, 112b of the ring 16 such that the lid 24 can be lifted off of the container 11 and removed from the container 11.

Thus, in a normal or resting position, the at least one biasing member 84 urges the first end 29a, 29b of each slider 28a, 28b outwardly away from the handle 82, such that the distal end 32a, 32b of each slider 28a, 28b is moved through one of the indentations 132 of the lid 24 and below and/or into one of the lips or recesses 112a, 112b of the container 11. In this normal or resting position, the lid 24 is generally securely attached to the container 11. When the user presses the first end 29a, 29b of each slider 28a, 28b inwardly towards the handle 82, such that the at least one biasing member 84 is compressed, the distal ends 32a, 32b are withdrawn and/or removed from the lips or recesses 112a, 112b of the container 11 such that the lid 24 can be removed from the container 11.

It will be appreciated by those skilled in the art that changes could be made to the embodiment described above without departing from the broad inventive concept thereof. It is understood, therefore, that this invention is not limited to the particular embodiment disclosed, but is intended to cover modifications within the spirit and scope of the present invention as defined by the appended claims.

I claim:

1. A kitchen appliance for cooking foodstuff in a liquid, said kitchen appliance comprising:
    an outer shell having an upper surface and a lower surface;
    a base enclosing said lower surface of said outer shell;
    a cooking pot positioned within said outer shell for receiving said foodstuff and said liquid, said cooking pot having an upper rim, an air gap being defined by the outer shell, the base and the cooking pot;
    a heating element positioned within said air gap;
    a rib mounted between and directly contacting both said upper surface of said outer shell and said upper rim of said cooking pot for preventing the flow of liquid into said air gap, said rib substantially surrounding said cooking pot adjacent said upper rim thereof;
    a ring between said upper surface of said outer shell and said rib; and
    wherein said cooking pot includes a pour spout in direct contact and directly extending from said upper rim thereof, said pour spout integrally forming an extension of the cooking pot, said rib including a channel, said channel being sized and shaped to receive the pour spout of said cooking pot therein.

2. The kitchen appliance according to claim 1, wherein said cooking pot is fixedly mounted directly to said base.

3. The kitchen appliance according to claim 2, wherein an elongated rod is fixedly attached to a closed bottom surface of said cooking pot, said rod extending through an opening in said base.

4. The kitchen appliance according to claim 3, wherein an insulating spacer and a hex nut surround at least a portion of said rod.

5. The kitchen appliance according to claim 1, wherein said rib is formed of silicon.

6. The kitchen appliance according to claim 5, wherein a conduit is formed within said ring for receiving at least a portion of said silicon rib.

7. The kitchen appliance according to claim 1, wherein said kitchen appliance is a deep fryer and said liquid is cooking oil.

8. The kitchen appliance according to claim 1, wherein said ring further includes a conduit, said conduit being sized and shaped to receive said channel of said rib therein.

9. The kitchen appliance according to claim 8, wherein said outer shell includes a cut-out at said upper surface thereof, said cut-out being sized and shaped to receive said conduit of said ring therein.

10. The kitchen appliance according to claim 1, wherein said rib and said ring each include a diameter, the diameter of the rib being less than a diameter of the ring.

11. The kitchen appliance according to claim 1, wherein said channel is larger than the general size and shape of the pour spout of the cooking pot.

* * * * *